Dec. 23, 1947.  J. WECKSTEIN  2,433,076
METAL-WORKING MACHINE
Filed June 9, 1944  2 Sheets-Sheet 1
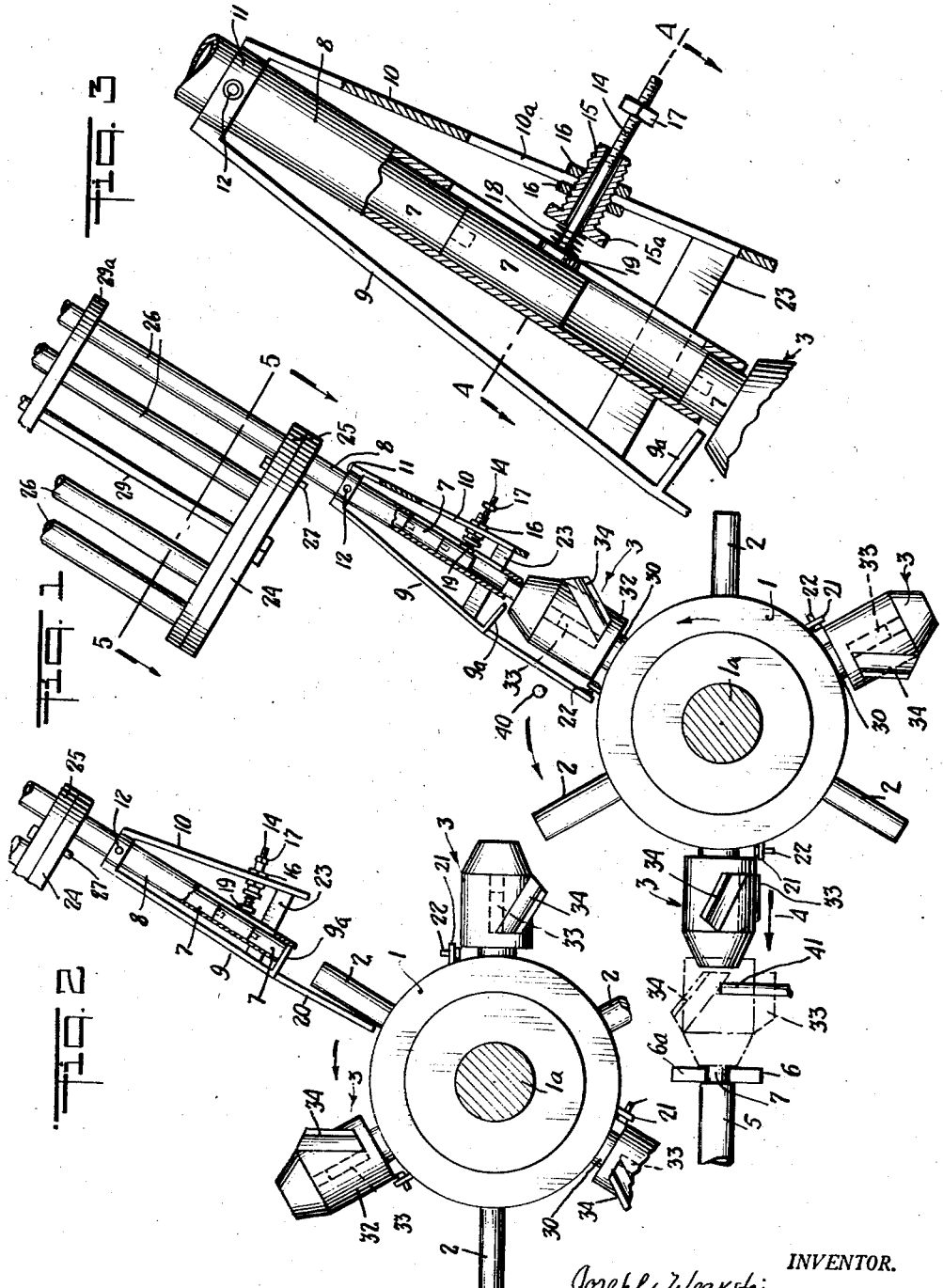
INVENTOR.
Joseph Weckstein
BY Mock & Blum
ATTORNEYS Dec. 23, 1947.         J. WECKSTEIN         2,433,076
METAL-WORKING MACHINE
Filed June 9, 1944              2 Sheets-Sheet 2
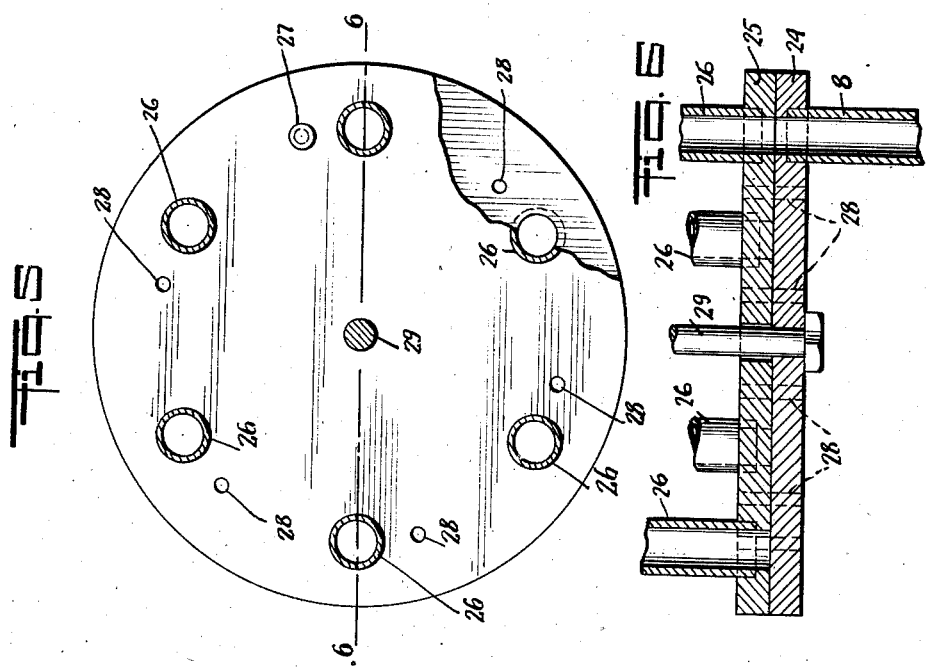
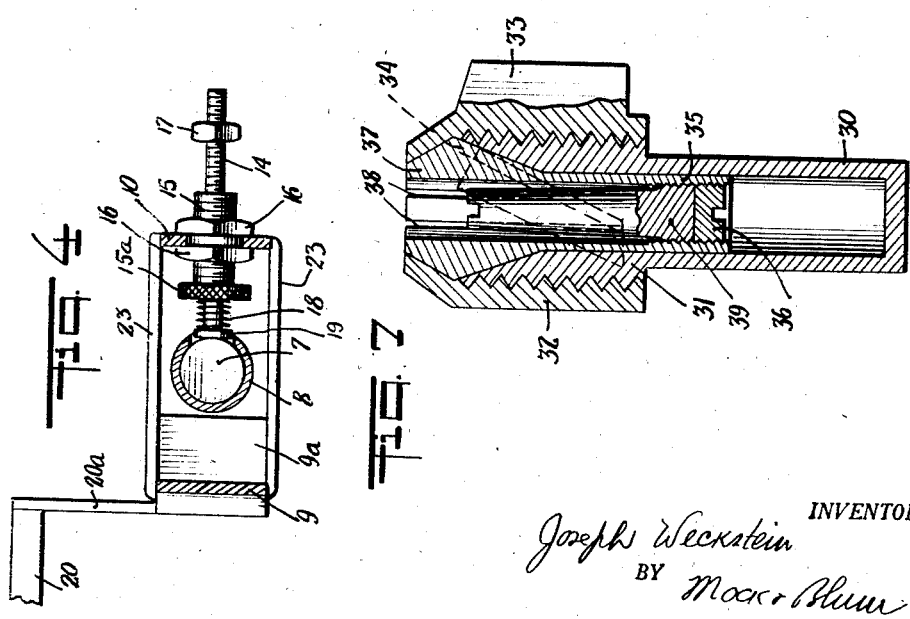
INVENTOR.
Joseph Weckstein
BY Mock & Blum
ATTORNEYS Patented Dec. 23, 1947

2,433,076

UNITED STATES PATENT OFFICE 2,433,076

METALWORKING MACHINE

Joseph Weckstein, New York, N. Y.

Application June 9, 1944, Serial No. 539,537

5 Claims. (Cl. 29—60)

My invention relates to a new and improved attachment to a metal working machine. While the invention relates particularly to an attachment to a screw machine, the invention applies generally to all types of turret machines.

One of the objects of my invention is to lower the cost of production in operating upon the unworked end of a work-piece, after one end of said piece has been worked. The forming or other working of the unworked end of a work-piece, after one end of said piece has been worked, is known in the trade as the "second operation."

Another object of my invention is to provide an attachment whereby the work-pieces upon which the first operation has been performed, are fed automatically, one by one, to one or more turret-chucks which are mounted upon a turret or other transfer mechanism. The turret-chucks are actuated in unison with the turret in order to transfer the respective work-pieces from the turret-chucks to an auxiliary chuck. As an example, this auxiliary chuck may be the spindle of a standard screw machine which has as automatically operated chuck. While the work-pieces are held in the auxiliary chuck, the second operation is performed. The invention is not limited to the use of an auxiliary chuck, because the second operation such as slotting, sawing, drilling, etc., may be performed while the work-piece is held in the turret-chuck.

The invention is illustrated in connection with, but it is not limited to, a machine which has a rotatable turret which is mounted to slide back and forth in a predetermined direction, in addition to the rotary movement of the turret.

Another object of my invention is to provide improved automatic means for transferring the work-pieces, one by one, from a magazine to the respective chucks of the turret.

Another object of my invention is to provide automatic means whereby the turret chucks are tightened as they move away from the magazine or other source of supply of the work-pieces, and said transfer chucks are automatically opened, in order to permit the transfer of the work-pieces from the turret chucks to the auxiliary chuck. If the "second operation" is done on the work-pieces while they are held in the turret chucks, said turret chucks are automatically opened after this second operation and the work-pieces drop out.

By means of my invention, after the first operation has been performed upon each work-piece, said work-pieces are transferred to suitable chutes or other magazines. The work-pieces are automatically removed, one by one, from said chute or other magazine, and the work-pieces are automatically transferred to the auxiliary chuck which holds the respective work-piece, while the second operation is performed on the respective work-piece. This eliminates a good deal of manual labor, and the operation is very much faster, thus reducing time and expense.

Numerous additional important objects of my invention will be stated in the annexed description and drawings which illustrate a preferred embodiment thereof.

Fig. 1 is a side elevation of the improved attachment, the gate of the transfer chute being shown in the open position.

Fig. 2 is a partial view of Fig. 1, the gate of the transfer chute being shown in the closed position.

Fig. 3 is an enlarged detail sectional view of the transfer chute and of certain auxiliary parts. The bottom work-piece which is shown in Fig. 3, is shown in its position which is anterior to the final position in which said bottom work-piece clears the transfer chute.

Figs. 4 and 5 are respectively sectional views on the lines 4—4 and 5—5 of Figs. 3 and 1.

Fig. 6 is a sectional view on the line 6—6 of Fig. 5.

Fig. 7 is a detail sectional view of the turret chuck.

Fig. 1 shows the conventional turret 1 of any suitable vertical turret machine. A plurality of tools 2 are mounted upon the turret 1. In the particular embodiment which is illustrated herein, these tools 2 perform what is designated as the "second operation." The turret 1, in addition to being rotatable about its central horizontal shaft 1a, is also horizontally slidably movable back and forth in a direction parallel to the arrow 4. These conventional parts are well known per se, and they require no further illustration.

A transfer chute 8 is fixed to a disk 24 which is suitably fixed to the frame of the machine. A supplemental disk 25 is rotatably connected to the fixed disk 24, by means of a pivot pin 29. Said pivot pin 29 extends through a suitable fixed member 29a, which is fixed to the frame of the machine. The pivot pin 29 is turnable in said member 29a.

A series of tubular magazines 26 are detachably fixed to the rotatable disk 25. The bottom disk 24 is provided with a single bore. The disk 25 can be rotated, in order to aline a selected magazine 26 with said bore of the disk 24 and with the transfer chute 8. The rotatable disk 25 is provided with a series of holes 28. These holes 28 can be alined with the locating holes which are provided in the fixed disk 24. The disk 25 can then be held against rotation relative to the disk 24 by means of a removable locking pin 27, which extends through one of the holes 28 and one of said locating holes of disk 24. When the removable locking pin 27 extends through one of the holes 28, the respective magazine chute 26 is alined with the single fixed transfer chute 8.

The work-pieces 7 are piled in the respective magazine chutes 26, after the first operation or series of operations have been performed at one end or adjacent one end of each of the work-pieces 7. In Fig. 1, if each work-piece 7 is to be held in the auxiliary chuck 5, while the second operation or operations are performed on the respective work-piece 7, the upper ends of the work-pieces 7 are the ends in which or at which the first operation or series of operations have been performed. For example, the upper ends of the work-pieces 7 may have been tapped, cut, or otherwise formed. This auxiliary chuck 5 is designated as the spindle in a screw machine.

As previously mentioned, the second operation may be performed by tools which are not fixed to the turret 1 and without the use of the auxiliary chuck 5. In such case, the positions of the work-pieces 7 in the magazine chutes 26 and in the transfer chute 8 will be reverse to the position previously stated, so that the lower ends of said work-pieces 7 will then be the ends at which the first operation or operations have been performed.

As best shown in Fig. 3, a cross-bar 11 is turnably connected to the wall of the transfer chute 8 by means of a pivot pin 12. This cross-bar 11 is rigid and integral with the rigid gate 9, and also with the rigid arm 10 of the gate 9. The rigid gate 9 has a rigid stop-plate 9a. In the position shown in Fig. 2, the stop-plate 9a closes the mouth of the transfer chute 8. In the positions shown in Fig. 1 and Fig. 3, the stop-plate 9a clears the mouth of the transfer chute 8, so that the bottom work-piece 7 can slide downwardly and enter the respective turret-chuck 3.

As shown in Fig. 3, the arm 10 of the gate 9 is longitudinally slotted in order to provide a longitudinal slot 10a. An externally threaded sleeve 15, which has a knurled head 15a, is located in the longitudinal slot 10a of the arm 10. The sleeve 15 is adjustable in this longitudinal slot 10a of the arm 10, in a direction parallel to the longitudinal axis of said slot 10a, in order to make allowance for the respective lengths of the work-pieces. The sleeve 15 is thus adjusted for work-pieces 7 of a predetermined length. When it is desired to change the lengths of the work-pieces 7, the longitudinal adjustment of the sleeve 15 is correspondingly changed.

The sleeve 15 is clamped to arm 10 in the desired longitudinal adjusted position, by means of clamping nuts 16. A rod 14 is longitudinally slidable in the longitudinal bore of the sleeve 15. The outer end of the rod 14 is externally threaded. A stop-nut 17 is adjustably fixed on the threaded outer end of the rod 14, in order to limit the longitudinal movement of the rod 14 towards the transfer chute 8. At its inner end, a clamping head 19 is fixed to the slidable rod 14. As shown in Fig. 4, the transfer chute 8 is provided with a longitudinal slot through which the clamping head 19 can extend, in order to clamp the respective adjacent work-piece 7. The work-piece 7 which is thus clamped, succeeds the bottom work-piece in transfer chute 8, prior to the transfer of said bottom work-piece to the respective turret-chuck 3. A compression spring 18 has one end thereof abutting the clamping head 19. The other end of the compression spring 18 abuts the head 15a of the sleeve 15. The clamping head or clamping button 19 is thus biased by spring 18 into clamping position.

The gate 9 is provided with an extension arm 20. The biasing force of gravity normally holds the gate 9 in the closing position which is shown in Fig. 2. The biasing force of gravity can be replaced by a spring or any other suitable means. The turret 1 is provided, adjacent each chuck 3, with a projection 21, to which a finger 22 is adjustably fixed. Each finger 22 can be adjusted relative to its projection 21, in a direction towards and away from turret chuck 3, and also in a direction which is tangential to the cylindrical periphery of turret 1. This last-mentioned direction of adjustment is perpendicular to the respective finger 21.

In Fig. 1, one of the chucks 3 is shown in the receiving or transfer position, in which it is alined with the transfer chute 8. Just prior to the movement of each turret chuck 3 to its receiving or transfer position, the respective finger 22 strikes the extension arm 20, thus opening the gate 9 and its plate 9a to the release or inoperative position which is shown in Fig. 1, in unison with arm 10. At this moment, the clamping head 19 clamps the work-piece 7 which is directly above the bottom work-piece 7 which is located in the transfer chute 8. The turret 1 is turned intermittently. While each turret chuck 3 is held in said transfer position, the bottom work-piece 7 slides by gravity down the inclined transfer chute 8 into the respective alined turret-chuck 3, which is then open. The bottom work-piece 7 slides sufficiently into the respective chuck 3, in order to clear the transfer chute 8. Fig. 3 shows the bottom work-piece 7, before it has slid into its final position in the respective open turret-chuck 3.

After the work-piece 7 is finally located in and clamped by the respective turret-chuck 3, a part of the work-piece 7 protrudes from the respective turret-chuck 3. If the auxiliary chuck 5 is used, this protruding part of the work-piece 7 enters the auxiliary chuck 5, enabling the transfer of the work-piece from the respective turret-chuck 3, to the auxiliary chuck 5. If the auxiliary chuck 5 is not used, the tool or tools can operate upon the portion of the work-piece 7 which is held projecting from the respective turret-chuck 3.

The gate 9 and the arm 10 are also rigidly connected to each other by the rigid transverse arm 23, which turns in unison with gate 9 and arm 10, around pivot 12.

As shown in detail in Fig. 7, each turret-chuck 3 comprises a hollow housing 30, which is detachably fixed in a suitable recess of the turret 1. Each housing 30 is provided with an enlarged head 31, which is externally threaded. Each turret-chuck 3 is provided with a collar 32, which is internally threaded so that it can be screwed upon the head 31 of the housing 30. The housing 30 and its head 31 are unslitted. Each housing 30 is provided with a hollow insert 35. Each insert 35 is provided with a series of longitudinal slots 38, so that the outer end-portion of each insert 35 is resilient and said resilient outer end-portion of insert 35 can clamp a work-piece 7.

The slots 38 extend about half the length of the insert 35. Each collar 32 is provided with a fin 33 which is parallel to the longitudinal axis of the housing 30. Each collar 32 is also provided with an inclined fin 34, which is inclined to the longitudinal axis of the housing 30.

Each insert 35 is provided with an internal stop 39. Each stop 39 has an external thread at its inner end and this external thread adjustably engages an internal thread of the insert 35 so that each stop 39 is longitudinally adjustable relative to its insert 35. A lock-nut 36 is provided in order to hold each stop 39 in its adjusted position. Each stop 39 is thus longitudinally adjusted, in order to limit the longitudinal insertion of the respective workpiece 7 into the respective insert 35. Each insert 35 has a head 37 whose exterior wall has the double taper which is shown in Fig. 7. The head 31 and the collar 32 have respective tapers which correspond to this double taper. If the turret chuck which is shown in Fig. 7 is viewed from above, a clockwise turning of the collar 32 will close the chuck by laterally compressing the resilient end-portion of insert 35, and a counter-clockwise turning of the collar 32 will open the chuck by permitting said resilient end portion to expand laterally to normal size. Hence the clamping means of each turret-chuck 3 are biased to non-clamping position.

The machine is provided with a fixed finger 40, adjacent the transfer chute 8. After the respective turret-chuck 3 has received the respective work-piece 7, its axial fin 33 strikes this finger 40, thereby turning the collar 32, in order to clamp the respective work-piece 7 in the respective turret chuck 3. The turret 1 can thus be turned counterclockwise, referring to Fig. 1, until the turret-chuck 3 is alined with the auxiliary chuck 5, without any danger of the work-piece dropping out of the turret-chuck, because each turret-chuck 3 is tightened to clamp its work-piece 7, while the turret-chuck 3 is in upstanding and in vertical or substantially vertical position.

The machine is provided with another fixed finger 41, adjacent the auxiliary chuck 5. After each turret-chuck 3 has been alined with the auxiliary chuck 5, the turret 1 is moved longitudinally in the direction of the arrow 4, towards the auxiliary chuck 5. During this longitudinal movement of the turret 1, the pin 41 strikes the inclined fin 34, thus automatically opening the turret-chuck 3 by turning the collar 32. The longitudinal movement of the turret 1 automatically inserts the protruding part of the respective work-piece 7, partially into the auxiliary chuck 5. The auxiliary chuck 5 is then automatically tightened by the well-known mechanism of the machine, thus completing the transfer of each respective work-piece 7 from the turret-chuck 3 to the auxiliary chuck 5. The turret 1 is then moved longitudinally in a direction reverse to the direction of the arrow 4, leaving the respective work-piece 7 clamped in auxiliary chuck 5. The reference numeral 6 diagrammatically illustrates a tool which may operate upon the end of the work-piece 7 which protrudes from the auxiliary chuck 5, while said work-piece is clamped and rotated by chuck 5. The reference numeral 6a indicates a cut-off tool, which is used in the original standard screw machine work. This cut-off tool 6a is normally idle in performing the second operation or operations, although it can be used for removing burrs, etc. If the auxiliary chuck 5 is not used, the pin 41 may be located so that when the turret chuck 3 is opened, the work-piece 7 upon which the second operation or operations have already been performed, can slide downwardly out of the respective turret-chuck 3 into a suitable basket.

The performance of the second operation or operations, while the work-piece is held in the auxiliary chuck 5, requires no description, since this is conventional per se. While the machine is running the work-pieces are necessarily of the same length. However, it is possible to operate upon work-pieces of different lengths, by stopping the machine and then making the necessary adjustment of the stop 39, the sleeve 15 and other parts which require such adjustment.

The insert 35 can be interchanged, in order to allow for work-pieces of different diameters.

For the same reason, the transfer chute 8 is interchangeable.

As shown in Fig. 4, the extension arm 20 is connected to the gate 9, by means of a transverse arm 20a, in order to allow for the necessary clearance between the turret-chucks 3 and said extension arm 20.

If a work-piece is not properly aligned with chuck 5 in the transfer position shown in Fig. 1, in which the respective turret-chuck is shown in broken lines, damage may result to the machine. In order to prevent this, the connection between stop 39 and lock-nut 36, and the insert 35, may be made sufficiently weak so that a substantial longitudinal thrust on the insert 39 will force it and the lock-nut 36 inwardly relative to insert 35 and the housing 30. This can be done by making insert 39 and lock-nut 36 of yieldable material, so that their external threads can be easily stripped under longitudinal force. The housing 30 and its assembled insert 35 are designated as the body-portion of chuck 3.

The operation of the improved device is as follows:

As an example, it is assumed that each work-piece 7 has previously been operated upon, as in a standard screw machine. In such standard screw machine, a long metal rod is fed longitudinally from the back of the machine through the spindle of chuck 5, forwardly towards the turret 1, until it hits an adjustable stop on turret 1, which halts its forward longitudinal movement.

While the metal rod is fed longitudinally forward through the spindle of chuck 5, said spindle is rotated continuously, but its chuck is open, so that the metal rod is not rotated.

When the longitudinal forward feed of the metal rod is stopped, the chuck of said spindle is automatically closed, because the screw machine is adjusted to operate for automatic intermittent feed of the metal rod. While the metal rod is thus rotated, the forming tool 6 and the turret tools are operated, in order to form the side of the work-piece and also the end of the work-piece nearest to the turret. This end can be formed internally or externally. When this is finished, the cut-off tool 6a is operated in order to cut off the work-piece which falls into a basket.

It is now necessary to work each work-piece, at the end thereof which was left unworked in the standard screw machine. This is the main purpose of my improvement, although the invention is not restricted to any particular purpose or use.

The work-pieces 7, each of which has been worked at one end in the standard screw machine, are piled in the magazines 26, with each previously worked end upwards. Alternate tools 2 are replaced by turret-chucks 3, as an example. One of the magazines 26 is alined with transfer chute 8, and the disks 24 and 25 are locked to maintain said alinement.

The machine shown herein can be a standard screw machine for example, in which the turret-chucks 3 have thus been inserted into the turret 1, and to which the other auxiliary parts have been attached.

The plate 9a of gate 9 normally prevents the bottom work-piece 7 from sliding out of the transfer chute 8, because gate 9 is biased to closing position. When the gate 9 is in the closed position shown in Fig. 2, the clamping head 19 exerts no clamping pressure upon the respective work-piece 7 which succeeds the bottom work-piece 7 in chute 8.

When the turret 1 is in the position shown in Fig. 2, the tool 2 which is then aligned with transfer chute 8 does not abut extension arm 20, because arm 20a holds extension arm 20 rearwardly spaced from tools 2 and chucks 3, in a direction which is parallel to shaft 1a of turret 1.

The tools 2 of turret 1 must be of less length than the turret chucks 3 so that said tools 2 can pass under the transfer chute 8, when turret 1 rotates.

The turret 1 is now turned through an angle of 60 degrees. In this example, the turret 1 is turned intermittently through successive angles of 60 degrees, with sufficient dwell between successive turning movements, in order to give time for the turret to reciprocate in a direction parallel to arrow 4, and to enable the respective tool 2 to perform the second operation.

As turret 1 substantially completes its turning movement of 60 degrees, the respective finger 22 strikes the end of extension arm 20, thus turning gate 9 to the open position shown in Fig. 1. The gate 9 is thus moved to its open position, when the respective turret-chuck 3 is substantially alined with transfer chute 8. Hence, the bottom work-piece 7 cannot drop out of transfer chute 8, and said bottom work-piece slides into the respective turret-chuck 3. Said work-piece 7 wholly clears the end of transfer-chute 8 when said work-piece 7 has been properly inserted into the turret-chuck 3. The turret-chuck 3 is then open. The length of the insertion of the work-piece 7 into the respective turret-chuck 3, is determined by the adjustment of stop 39. All the work-pieces 7 which are at that time in the magazine chutes 26 and in the transfer chute 8, are of the same length. When gate 9 is opened, spring 18 is compressed, so that the clamping head or button 19 temporarily clamps the second work-piece 7 in chute 8.

At about the beginning of the next rotation of turret 1 through an angle of 60 degrees, the respective finger 22 loses contact with extension arm 20, so that gate 9 turns to its closed position. The spring 18 is of sufficient length, so that plate 9a closes the mouth of transfer chute 8, at least partially, before the clamping pressure of head 19 is released.

When the plate 9a is in the closed position, the clamping pressure of head 19 is released, so that the pile of work-pieces 7 can slide downwardly in transfer chute 8 and its alined chute 26, until the bottom work-piece 7 abuts plate 9a.

During the respective turning movement of turret-chuck 3 through an angle of 60 degrees, away from transfer chute 8, the fin 33 strikes and then clears fixed pin 40, thus turning collar 32 to compress the resilient end-portion of insert 35, thus clamping the work-piece 7 in the turret-chuck 3. At the completion of the respective turning movement of 60 degrees, the turret 1 is moved in the direction of arrow 4, through a distance equal to the distance between the full-line position and the broken-line position of turret-chuck 3 in Fig. 1, without turning the turret 1.

Since the turret-chuck 3 is alined with auxiliary chuck 5, during this longitudinal and non-turning movement of turret 1, a portion of the part of work-piece 7 which projects from turret-chuck 3, is inserted into auxiliary chuck 5, which is now open. While turret-chuck 3 is moved from said full-line position to said broken-line position without rotating turret 1, the respective inclined fin 34 strikes fixed pin 41, thus rotating collar 32 to open turret-chuck 3.

If the work-piece 7 does not correctly enter auxiliary chuck 5, stop 39 and stop-nut 36 yield and they are pushed inwardly into housing 30, thus preventing any breakage or jamming of the machine.

After the work-piece 7 has entered auxiliary chuck 5, said auxiliary chuck 5 is automatically tightened by the usual screw machine cams (not shown) and the open turret-chuck 3 is moved back to its full-line position. When turret-chuck 3 is thus moved back to its full-line position, it remains open. The spindle 5 is continuously rotated in the same direction, as in the standard screw machines but its chuck (not shown) is opened and closed at the proper time by the usual automatic control of the standard screw machine.

At the end of the next turning movement of 60 degrees, a respective turret tool 2 is alined with the work-piece 7, which has already been clamped and is being rotated by chuck 5. Such clamping and rotation of the work-piece continues while the tool 2 operates on the work-piece.

At the completion of the next sliding and non-turning movement of turret 1 in the direction of arrow 4, the respective tool 2 performs the second operation on the revolving and clamped work-piece in chuck 5.

Turret 1 is then slid away, from chuck 5, without turning until it reaches its rotating position. Auxiliary chuck 5 is then automatically opened by the usual screw machine cams (not shown) and the work-piece is automatically ejected, from auxiliary chuck 5, by a rod fastened to the usual feeding arm of a screw machine (not shown).

If the auxiliary chuck 5 is not used, suitable tools are located to operate on the exposed ends of the work-pieces which are held in turret-chucks 3, while turret 1 is held against rotating.

Instead of alternating tools 2 and turret-chuck 3, there may be two or more tools 2, between successive turret-chucks 3. This depends upon the number of tools necessary for the second operations.

I have described a preferred embodiment of my invention, but it is clear that numerous changes and omissions and additions can be made without departing from its scope.

For convenience, the transfer-chute 8 is designated as being rearwardly inclined, since it is inclined to a direction reverse to the direction of rotation of turret 1, relative to a vertical plane which passes through the horizontal axis 1a. The means for holding the turret 1 against rotation, while said turret 1 is horizontally reciprocated, are conventional and not shown. The position of the turret-chuck 3, when it registers with transfer chute 8, is designated as its alined or receiving position. The position of stop 40, which operates to close the respective turret-chuck 3 as it moves out of its alined position, succeeds said alined position. Similarly, the stop 41 succeeds the stop 40, and said stop 41 is located anterior said alined position. The position of the turret-chuck 3, at which the work-piece 7 is removed therefrom, is designated as its discharging position.

If the auxiliary chuck 5 is not used, the turret-chuck 3 may be downwardly inclined instead of being horizontal, at the discharging position. The discharging stop member 41 may be located at any point which succeeds the closing member 40, and which is anterior the receiving position. At the discharging position, the work-piece 7 may be ejected from the turret-chuck 3 by gravity or any suitable mechanism. The invention is not limited to stationary closing and discharging members or means 40 and 41.

In the disclosed embodiment, the turret 1 is always turned in the same direction, but the invention is not limited to unidirectional rotation of said turret.

The position of the turret 1 which corresponds to the full-line position of the horizontally-located turret-chuck 3 in Fig. 1, is designated as the position of rotation, because the turret is not rotated while it is being moved in its auxiliary path relative to its axis of rotation, such as the horizontal path which is indicated in Fig. 1.

I claim:

1. In combination, a turnable turret which has a horizontal axis of rotation, said turret being also movable without rotation thereof in a straight-line path which is horizontal and perpendicular to said axis, towards and away from predetermined receiving station, said turret being rotatable about said axis when said turret is located at said receiving station, said turret having a turret-chuck connected thereto and movable in unison with said turret, said turret-chuck having a hollow body portion whose outer end-portion is slitted to provide resilient clamping fingers which are biased by their resilience to inoperative non-clamping position, said body-portion having a longitudinal axis which is radial relative to said axis of rotation, said body-portion having an external head at said outer end-portion, said head having an external tapered wall, said body portion having an external thread, a collar having an internal thread which engages said external thread, said collar being turnable relative to said body portion around said longitudinal axis, said collar having an internal tapered wall which abuts said external tapered wall, the radial movement of said collar relative to said body portion in a predetermined direction forcing said clamping fingers towards each other to clamping position, said collar having a first external fin and a second external fin, an upstanding delivery chute located at said receiving station and dimensioned to hold a plurality of work-pieces, said chute having an open bottom and having a movable gate which is biased to close said open bottom, said turret having a finger which is located in advance of said turret-chuck in the direction of rotation of said turret around said axis, said finger being located and operative to strike a member which is connected to said gate so as to open said gate when said turret-chuck is substantially alined with said upstanding chute so that the bottom work-piece in said chute is then transferred by gravity to said hollow body-portion, said hollow body-portion being dimensioned to receive said work-piece with a portion of said work-piece protruding from said hollow body-portion, said gate being fixed to an arm, a sleeve fixed to said arm, a clamping rod slidable in said sleeve, said rod having a clamping end which enters said chute through a slot thereof, said rod being biased to clamping position, said rod being located so that its clamping end clamps the work-piece in said chute which is spaced from said open bottom end by the height of a work-piece, said arm being located so that said clamping end releases said respective work-piece only when said gate closes said bottom end, a first fixed finger which is located to strike said first fin to move said collar in said predetermined direction, while said turret is located at said receiving station and immediately after said bottom work-piece has been thus transferred to said turret chuck, said first fin being parallel to said longitudinal axis and said second fin being inclined to said longitudinal axis, a second fixed finger located in said horizontal path to strike said second fin to move said collar in a direction which is reverse to said predetermined direction, said second finger being operative when said turret is moved in said path away from said receiving station.

2. A combination according to claim 1 in which an auxiliary chuck is located in said horizontal path to receive the work-piece from said turret-chuck, during the movement of said turret away from said receiving station.

3. In combination, a receiving station, a turret adjacent said receiving station and mounted for rotation around a turret axis and also for movement without rotation in a selected path towards and away from said receiving station, a chuck fixed to said turret, said chuck having gripping means normally biased to non-gripping position, actuating means operative to move and hold said gripping means in gripping position, said actuating means including a collar turnably connected to said turret, said actuating means being operative and adapted to move and hold said gripping means in a gripping position when said collar is turned in an operating stroke and to release said gripping means to move to said non-gripping position when said collar is turned in a direction reverse to said operating stroke, said collar having a first projection and a second projection thereon, a first stop located adjacent said receiving station in position to contact said first projection and to turn said collar in said operating stroke when said turret is turned around said turret-axis to move said chuck out of receiving position at said receiving station, and a second stop spaced from said receiving station in said selected path and located to contact said second projection to turn said collar in said reverse direction upon movement of the turret in said path.

4. In combination, a receiving station, a turret adjacent said receiving station and mounted for rotation around a horizontal turret axis and also for movement without rotation in a horizontal straight-line selected path towards and away from said receiving station, a plurality of chucks mounted in said turret and spaced therearound, each of said chucks having gripping means normally biased to non-gripping position, actuating means operative and adapted to move and hold said gripping means in gripping position, said actuating means including a collar turnably connected to said turret, said actuating means being operative and adapted to move and hold said gripping means in a gripping position when said collar is turned in an operating stroke and to release said gripping means to move to said non-gripping position when said collar is turned in a direction reverse to said operating stroke, said collar having a first projection and a second projection thereon, a first stop located adjacent said receiving station in position to contact said first projection and to turn said collar in said operating stroke when said turret is turned around said turret-axis to move said chuck out of receiving position at said receiving station, a second stop spaced from said receiving station in said selected path and located in position to contact said second projection upon movement of the turret in said path to turn said collar in said reverse direction, said chuck being upstanding in said receiving position, said first stop being sufficiently close to said receiving station to contact said first projection and to turn said collar in said operating stroke while said chuck is upstanding to retain the received object by gravity.

5. In combination, a receiving station, a turret adjacent said receiving station and mounted for rotation around a horizontal turret axis and also for movement without rotation in a horizontal straight-line selected path towards and away from said receiving station, a chuck fixed to said turret and constructed to grip a work-piece with a portion of said work-piece protruding therefrom, said chuck having gripping means normally biased to non-gripping position, actuating means operative and adapted to move and hold said gripping means in gripping position, said actuating means including a collar turnably connected to said turret, said actuating means being operative and adapted to move and hold said gripping means in a gripping position when said collar is turned in an operating stroke and to release said gripping means to move to said non-gripping position when said collar is turned in a direction reverse to said operating stroke, said collar having a first projection and a second projection thereon, a first stop located adjacent said receiving station in position to contact said first projection and to turn said collar in said operating stroke when said turret is turned around said turret-axis to move said chuck out of receiving position at said receiving station, a second stop spaced from said receiving station in said selected path and located in position to contact said second projection upon movement of the turret in said path to turn said collar in said reverse direction, said chuck being upstanding in said receiving position, said first stop being sufficiently close to said receiving station to contact said first projection and to turn said collar in said operating stroke while said chuck is upstanding to retain the received object by gravity, and a second chuck aligned with said horizontal straight-line selected path, in position to engage the protruding end of the work-piece carried by the first chuck, the second stop being arranged adjacent the second chuck in position to release the first chuck from the work-piece when the work-piece is in alignment with the second chuck.

JOSEPH WECKSTEIN.

REFERENCES CITED

The following references are of record in the file of this patent:

UNITED STATES PATENTS

| Number | Name | Date |
|---|---|---|
| 218,841 | Ward | Aug. 26, 1879 |
| 1,287,669 | Gillette | Dec. 17, 1918 |
| 1,704,032 | Brown et al. | Mar. 5, 1929 |
| 2,167,308 | Nadelin | July 25, 1939 |
| 469,325 | Bowers et al. | Feb. 23, 1892 |
| 938,390 | Lewis | Oct. 26, 1909 |
| 1,953,830 | Park | Apr. 3, 1934 |
| 445,694 | Grout et al. | Feb. 3, 1891 |
| 445,697 | Grout et al. | Feb. 3, 1891 |
| 579,367 | Brown | Mar. 23, 1897 |
| 876,360 | Kraft | Jan. 14, 1908 |

FOREIGN PATENTS

| Number | Country | Date |
|---|---|---|
| 350,836 | France | June 27, 1905 |